United States Patent [19]

Hudson

[11] 4,258,746
[45] Mar. 31, 1981

[54] FLOAT VALVE WITH VARIABLE LIQUID BALLAST

[76] Inventor: George D. Hudson, 120 Hobbs Cir., Santa Paula, Calif. 93060

[21] Appl. No.: 43,137

[22] Filed: May 29, 1979

[51] Int. Cl.³ .................................... F16K 31/18
[52] U.S. Cl. ............................... 137/414; 137/428; 137/433; 137/444; 251/46
[58] Field of Search ............... 137/414, 428, 429, 430, 137/432, 433, 437, 444, 451; 251/45, 46

[56] References Cited
U.S. PATENT DOCUMENTS

| 3,693,649 | 9/1972 | Gordon et al. | 137/414 |
| 3,893,475 | 7/1975 | Hudson | 251/46 |
| 4,013,091 | 3/1977 | Hudson | 251/46 |

Primary Examiner—Martin P. Schwadron
Assistant Examiner—G. L. Walton
Attorney, Agent, or Firm—Paul A. Weilein

[57] ABSTRACT

Improvements are disclosed for a float valve of the type including a main valve that controls an inlet port, a control chamber having a bleeder port and a pilot valve member unitary with a float to control the bleeder port and thereby adjust pressure in the control chamber for regulating actuation of the main valve. In order to increase the float cycle of the valve, a water reservoir is formed by the float for receiving water and increasing weight of the float while the valve is actuated during each float cycle, the reservoir including vent means for emptying the reservoir when the valve is deactuated in order to then reduce the weight of the float. Additional improvements are provided to facilitate operation of the valve.

11 Claims, 2 Drawing Figures

FLOAT VALVE WITH VARIABLE LIQUID BALLAST

BACKGROUND OF THE INVENTION

The present invention relates to improved float valves and more particularly to float valves of the type including a regulating pilot valve which is operated by a float responsive to the level of water or other liquid supplied by the valve.

Such a float valve is disclosed in my earlier U.S. Pat. No. 4,013,091 entitled FLOAT-CONTROLLED VALVE, issued Mar. 22, 1977, which patent is hereby incorporated into the present disclosure by reference. A similar float valve is also disclosed by my still earlier U.S. Pat. No. 3,893,475 entitled FLOAT VALVE, issued July 8, 1975.

A float valve of the type disclosed by each of the above-noted patents includes a valve casing having an upper supply port controlled by a main valve member. A diaphragm carrying the main valve member cooperates with a bottom wall of the casing to form a control chamber. Increasing pressure in the control chamber causes the main valve member to close against the supply port while decreasing pressure causes the main valve member to retract into an open position. Water pressure is preferably supplied to the control chamber through a small conduit means in the form of an upright tube carried by the main valve member and extending upwardly through the supply port.

In order to control opening and closing of the supply port by the main valve member, pressure within the control chamber is regulated by a bleeder port formed in a fixed bottom wall of the valve casing, the bleeder port being opened and closed by means of a small upright pilot valve member mounted upon the upper side of a float element. The pilot valve member is preferably a simple pin which cooperates with a valve seat in the form of a small O-ring held in place by suitable retainer means.

A valve of the type summarized above and disclosed by the above-noted references performs very satisfactorily in regulating the liquid level in a vessel supplied from the supply port. Such a float valve has been found to be particularly rugged and capable of trouble-free operation over extended periods of time.

However, in order to even further improve operation of such float valves, it has been found desirable to stabilize operation of the float valve by reducing sensitivity to momentary fluctuations in water level produced for example by small ripples or waves in a liquid which controls the float valve. This need was partially met by my second U.S. Pat. No. 4,013,091 wherein water from the bleeder port was discharged into an expansile chamber, the outlet of which was sufficiently restricted in order to further depress the float during valve actuation in order to increase the volume of water released during each float cycle. However, this feature does not effect response of the float to minor surface variations when the water level has dropped toward a point at which the valve is designed to open or be actuated.

SUMMARY OF THE INVENTION

Accordingly, it is an object of the invention to provide a float valve of the type summarized above wherein a variable water or liquid ballast is associated with the float in order to effectively increase the weight of the float during actuation of the valve and to relatively decrease the weight of the float when the valve is closed or deactuated.

It is a further object of the invention to provide means for closely regulating the amount of water ballast at all times during the operating float cycle.

At the same time, it is yet another object of the invention to prevent excessive response of the float to the force of liquid passing through the main valve member.

According to the present invention, such a variable water ballast is provided by means of an open reservoir formed by a portion of the float, the reservoir being positioned to receive water ballast during operation or actuation of the valve in order to then effectively increase the weight of the float. The reservoir also includes means for venting water from the reservoir at a selected rate so that the effectively increased weight of the float is maintained during actuation of the valve but, upon deactuation of the valve, liquid drains from the reservoir through the vent means in order to effectively decrease the weight of the float as long as the float valve remains deactuated. It will be immediately apparent that through such a combination, the float valve is made less responsive to minor variations in water level. At the same time, it may be seen that the effective operating cycle of the float valve is extended in that the relatively increased weight of the float during actuation of the valve causes the float to assume a lower level relative to the surrounding water level. During deactuation, the relatively decreased weight of the float causes it to assume a relatively higher position relative to the surrounding liquid level.

It is also particularly important to note that the present combination for stabilizing or limiting response of the float valve to minor water level fluctuations permits the normal outlet openings for the valve to be designed in order to readily comply with antisyphon regulations.

It is a related object of the invention to prevent or limit reaction of the reservoir means upon the float to the force of liquid flowing from the main valve member. As will be seen from the following description, the bleeder port and pilot valve are centrally arranged in the float valve assembly, while liquid from the main valve member flows downwardly about the periphery of the float. It would of course be possible, within the scope of this invention, to design the reservoir means associated with the float to receive a portion of the main valve flow. However, with a substantial portion of the main valve flow impinging upon the reservoir, the float may be maintained in a depressed or actuation position by the mere force of flow from the main valve member. Accordingly, in order to assure proper response of the reservoir means on the float, the reservoir has a reduced diameter so that it is not impinged by flow from the main valve but receives only low rate flow from the pilot valve. Preferably, the lower end of the float is relatively large in order to support guide means for controlling the position of the float. The upper portion of the float tapers inwardly toward the reservoir means in order to avoid direct impingement of flow from the main valve upon the reservoir means.

It is also an object of the invention to provide additional improvements for enhancing and facilitating operation of the float valve assembly. For example, the flexible diaphragm carrying the main valve member may permit the valve member to be canted or misaligned as it is carried upwardly and downwardly in response to pressure in the control chamber. According to the present invention, a stabilizing ring is formed upon the bottom wall of the valve casing and extends upwardly toward the diaphragm in order to permit free response of the diaphragm to pressure variations in the control chamber while limiting or minimizing misalignment of the diaphragm and main valve member. Similarly, U.S. Pat. No. 4,013,091 discloses an expansile chamber formed between the upper end of the float and the bottom wall of the casing for receiving liquid from the pilot valve. According to the present invention, portions of the float and bottom casing wall define a labyrinth passage for regulating flow of pilot fluid through the expansile chamber and achieving greater stability in operation of the float valve.

Additional objects and advantages of the present invention are made apparent in the following description having reference to the accompanying drawings.

BRIEF DESCRIPTION OF THE DRAWING

Referring to the accompanying drawing, which is for illustrative purposes only.

DESCRIPTION OF THE PRESENTLY PREFERRED EMBODIMENT

As was indicated above, the present invention relates to improvements in a float valve assembly of the type illustrated in my earlier U.S. patents as noted above. Accordingly, the float valve assembly of the present invention includes many parts in common with those references, particularly U.S. Pat. No. 4,013,091. Those common elements of the float valve are briefly described below in order to permit a complete understanding of the invention. Generally, the features of the float valve assembly common to the present invention and the above-noted patent are described first and include references to certain improvements of the present invention, particularly the stabilizing ring for the diaphragm labyrinth configuration for the expansile chamber. The reservoir means mounted upon the float is described, and thereafter followed by a description of the method of operation for the float valve assembly of the present invention.

Figure 1:
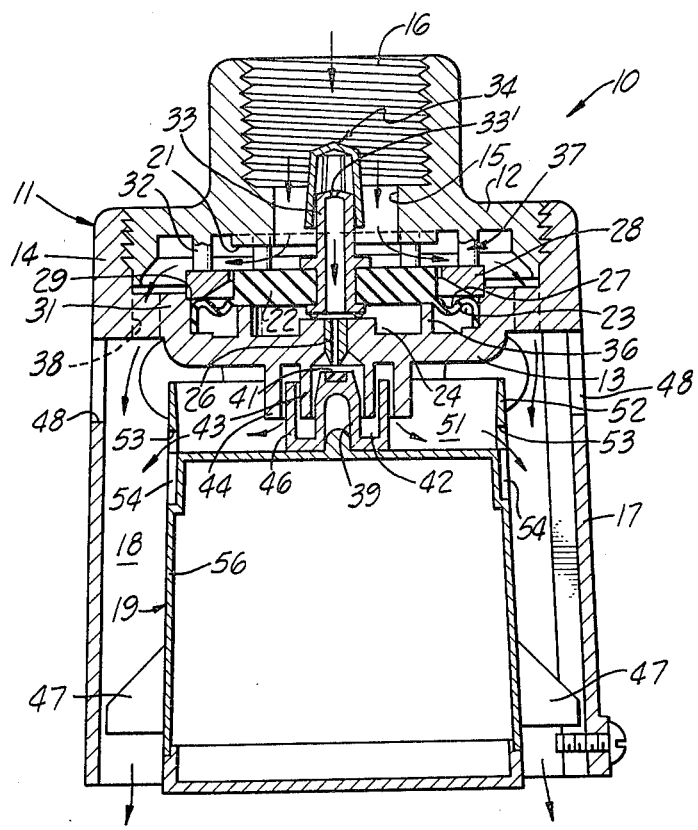
FIG. 1 is a vertical sectional view of a preferred embodiment of the improved float valve assembly of the present invention with parts illustrated in an open or actuated position.
Figure 2:
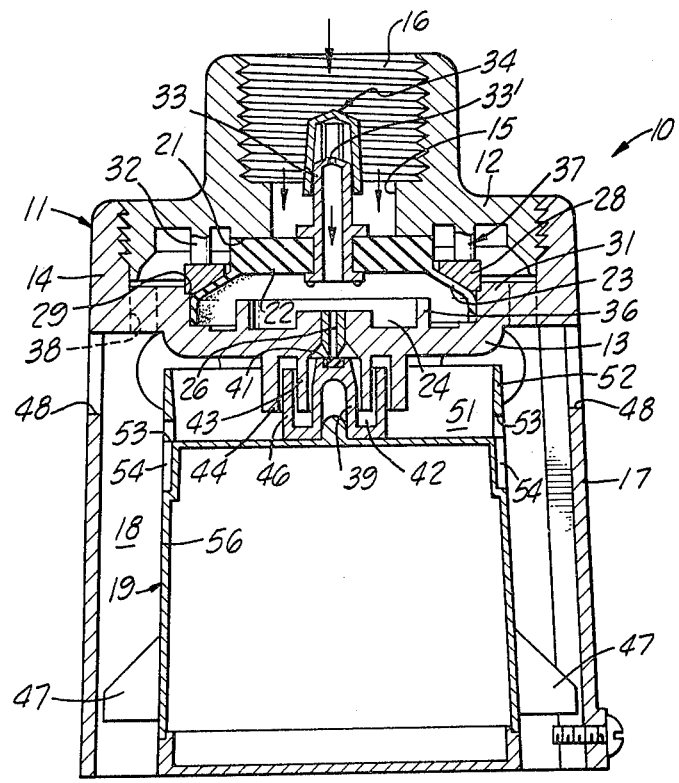
FIG. 2 is a similar view with the parts being illustrated in a closed or deactuated position.

Referring now to FIGS. 1 and 2, a float valve assembly constructed in accordance with the present invention, as indicated generally at 10, includes a cylindrical valve casing 11 having a top wall 12, a bottom wall 13 and a generally cylindrical outer wall 14. The top wall 12 is formed with an axial supply port 15 which is in communication with a threaded portion 16 adapted for connection with a supply pipe from a pressurized water source. A cylindrical hood 17 extends downwardly from the bottom wall 13 of the valve casing to form a float chamber 18 containing a hollow float 19.

The supply port 15 is formed with a flat annular valve seat 21 for engaging a main valve member 22 which is shown in its normal open or actuated position in FIG. 1 and its normal closed or deactuated position in FIG. 2.

The main valve member 22 is preferably formed from a solid body of a suitable elastomer with a diaphragm 23 being formed as an integral portion of the valve member and extending radially outwardly to form a flared skirt. The main valve member 22 and the diaphragm 23 serve as a movable upper wall of a control chamber 24 having a lower bleeder port 26 formed in the bottom wall 13. In the relaxed configuration of the diaphragm 23 as illustrated in FIG. 1, it is formed with a concentric fold 27 which provides the flexibility for allowing the main valve member 22 to rise into the closed or deactuated position of FIG. 1.

A retaining ring 28 secures the diaphragm 23 against the bottom valve casing wall 13, the retaining ring 28 resting upon an upper shoulder 29 of a rigid concentric wall 31 of the control chamber. The diaphragm and main valve member form an integral enclosure for the control chamber, the lower circumferential portion of the diaphragm being urged into sealing engagement with the concentric wall 31 by pressure within the control chamber. The retaining ring 28 is in turn held in place by a plurality of circumferentially spaced tongues 32 which project downwardly from the top wall 12 of the valve casing.

Water is supplied to the control chamber 24 by a small conduit or upright tube 33 which extends upwardly from the main valve member 22 through the supply port 15. The length of the tube 33 is selected so that its upper inlet end is always substantially spaced above the pressure drop and turbulence occurring at the supply port 15 when the main valve member 22 is retracted into its open position as illustrated in FIG. 1. The upper end of the tube 33 tapers to form a small inlet opening 33' which is sufficiently restricted to prevent solid particles from entering the control chamber. The upper end of the tube 33 also carries a cap strainer 34 which further serves to prevent particles from occluding the inlet opening 33'.

When the main valve member 22 is retracted to its open position as illustrated in FIG. 1, its lower surface is engaged by a stabilizing ring 36 formed upon the bottom wall 13 of the valve casing. The stabilizing ring 36 is one of the improved features of the present invention.

With the main valve member 22 in its open position, water from a connected supply source passes through the supply port 15 and flows radially outwardly through spaces 37 formed between the downwardly extending tongues 32. The main water flow then passes through passages 38 formed in the bottom wall 13 of the valve casing about the exterior of the control chamber 24. The water exiting the passages 38 flows downwardly through the float chamber 18 to raise the water level to which the float 19 is responsive.

At the same time, water flow through the bleeder port 26 is regulated by a pilot valve member 39 extending upwardly from the float 19 with an elastomeric valve seat 41 being disposed at its upper end for closing engagement with the bleeder port 26. An expansile chamber 42 is formed around the pilot valve member 39 by means of spaced-apart concentric skirts 43 and 44 extending downwardly from the bottom casing wall 13. A concentric skirt 46 is formed in concentrically spaced relation about the pilot valve member in order to pass in telescoping relation between the downwardly extending skirts 43 and 44. The skirts 43, 44 and 46 are always in overlapping relation in order to form a labyrinth passage within the expansile chamber 42. In operation of the expansile chamber, water flowing downwardly from the bleeder port 26 must pass through the labyrinth passage of the expansile chamber 42 which results in a relatively high pressure being developed in the expansile chamber as long as the bleeder port 26 is open.

Thus, during retraction of the pilot valve member from the bleeder port 26, increased pressure developed within the expansile chamber 42 causes the float 19 to assume a relatively lower level compared to the water level in the float chamber 18. As was noted above, the labyrinth passage formed within the expansile chamber 42 is also a feature of the present invention achieving more stabilized operation of the float valve assembly.

The float 19 is guided as it moves upwardly and downwardly by guide vanes 47 formed at its lower end which act against the inner surfaces of the hood 17.

A circumferential series of vent ports 48 formed in an upper portion of the hood 17 prevent the creation of a vacuum within the float chamber 18 and thus prevent undesirable back flow or syphoning of water from the float chamber through the float valve assembly.

As was noted above, a particularly important feature of the present invention comprises means forming a variable water ballast for the float 19, the ballast preferably being obtained by a reservoir 51 formed above the float 19 by an annular wall 52. Thus, the reservoir 51 is positioned to receive water passing from the pilot valve through the labyrinth passage of the expansile chamber 42 during actuation of the float valve assembly and particularly the pilot valve 39. Water is permitted to escape from the reservoir 51 at a predetermined rate by means of vent passages 53 formed at the base of the wall 52 about its circumference. With this arrangement, the height of the wall 52 and the volume of the reservoir 51 tend to determine the maximum additional weight afforded the float 19 by means of water tapped within the reservoir. The size of the vent passages 53 determines the rate at which the water is permitted to escape from the reservoir 51.

With the float valve assembly in its actuated condition, water flowing through the vent passages 53 does not prevent the reservoir 51 from becoming filled. However, when the pilot valve is closed or deactuated, water within the reservoir 51 is permitted to escape through the passages 53.

Because the passages 53 may be quite small, they preferably include means for breaking the surface tension of the water within the reservoir in order to assure that it escapes through the vent passages in order to reduce the weight of the float in accordance with the present invention. Preferably, down spouts 54 are formed about the float 19 beneath each of the vent passages 53. However, it would also be possible to employ other means such as wick material extending through each of the passages 53 to accomplish this purpose.

As was noted above, the reservoir 51 could be configured to trap a portion of water passing downwardly from the main valve. However, it is undesirable for the reservoir 51 to trap a substantial portion of the main valve flow since this might prevent the float from rising in response to a high water level in order to properly close the pilot valve. Accordingly, the outer surfaces of the float are formed by a cylindrical wall 56 which tapers upwardly and inwardly so that the reservoir 51 is not impinged by main valve water flowing from the passages 38.

The operation of the improved float valve assembly of the present invention is believed clearly apparent from the preceding description. However, its mode of operation is briefly described below in order to afford a more complete understanding of the invention. When the water beneath the float valve assembly is sufficiently high, the float 19 is urged upwardly in order to close the pilot valve which in turn causes increased pressure within the control chamber 24 to urge the main valve member 22 upwardly in order to engage the valve seat 21 as is illustrated in FIG. 2. With the float valve assembly in this condition, any water trapped within the reservoir 51 may escape through the vent passages 53 in order to minimize weight of the float 19. Accordingly, the float 19 tends to be positioned relatively high compared to the level of the surrounding water and thus increasingly forces the pilot valve towards closed position so that it is generally insensitive to minor surface variations caused by ripples or waves in the water. Thus, the float 19 does not tend to permit opening or actuation of the float valve assembly until the surrounding water level drops to a level requiring replenishment.

When replenishment is required, the float 19 is sufficiently lowered to disengage the pilot valve member 39 from the bleeder port 26. At that time, water pressure is permitted to escape from the control chamber 24 permitting the main valve member 22 to move downwardly in response to water pressure from the supply port 15. This, of course, permits water to flow radially outwardly about the main valve member through the spaces 37 and passages 38 in order to enter the float chamber 18. As was noted above, the tapered configuration of the float prevents this main water flow from impinging or entering the reservoir 51. The main valve member 22 moves downwardly in response to supply water pressure until it engages the stabilizing ring 36.

As the bleeder port 26 is uncovered by the pilot valve, water passing therethrough enters the expansile chamber 42 and, because of the labyrinth passage formed therein, develops substantial pressure within the expansile chamber 42 tending to urge the float relatively lower than its normal position.

Water passing through the expansile chamber 42 enters the reservoir 51 where it effectively increases the weight of the float 19 and urges it to a lower position relative to the surrounding water. Thus, operation of the float valve assembly tends to be stabilized during all phases of operation.

When the water in the surrounding tank rises sufficiently high to terminate a float cycle by causing the pilot valve to close the bleeder port 26, pressure is again restored in the control chamber 24, which forces the main valve member 22 upwardly into its normal closed position of FIG. 1.

Thereafter, when consumption of water from the surrounding tank causes the water level to drop in the tank, the water level must drop an appreciable amount before the pilot valve is permitted to initiate a new float cycle. Thus, operation of the float valve assembly is stabilized in that it tends to open and close or actuate and deactuate only in response to proper water levels within the float chamber.

Various modifications, substitutions and changes are apparent in addition to those specifically described above. Accordingly, the scope of the present invention is defined only by the following appended claims.

I claim:

1. In a float valve for replenishing a body of liquid from a pressurized liquid source in response to the level of the liquid body, wherein a control chamber is in communication with the pressurized source to develop pressure for closing a main valve against the pressurized liquid source, a pilot valve operated by a float in a float chamber opening and closing a bleeder port in communication with the control chamber, the pilot valve being mounted upon the float and movable therewith for opening and closing the bleeder port in response to the position of the float supported by the liquid, the improvement comprising an upstanding peripheral wall associated with the float and forming a reservoir for receiving liquid during actuation of the valve in order to increase the effective weight of the float, said reservoir including vent means in said wall for permitting liquid to escape from the reservoir at a controlled rate in order to reduce the relative effective weight of the float when the float valve is deactuated; and said pilot valve is centrally mounted on a wall at the top of the float within said reservoir.

2. A float valve according to claim 1, wherein the reservoir is positioned to centrally receive liquid discharged from the bleeder port.

3. A float valve according to claim 1, wherein said reservoir is formed to provide a predetermined volume for establishing the increased effective weight of the float when said reservoir is filled with liquid during actuation of the valve, and said vent means comprises multiple vent passages sized to regulate the rate at which liquid is permitted to escape from said reservoir when the float valve is deactuated.

4. A float valve according to claim 3, which further comprises means for facilitating liquid flow from the reservoir through the vent passages.

5. A float valve according to claim 4, wherein said flow facilitating means comprise down spouts respectively associated with each of the vent passages.

6. A float valve according to claim 1, wherein the reservoir is formed by a wall which surrounds the pilot valve and defines an open chamber above the float.

7. A float valve according to claim 1, wherein the control chamber has a movable wall for exerting pressure to close the main valve against the pressurized fluid source, and further comprises stabilizing means within the control chamber for maintaining proper alignment of the movable wall in the main valve open position.

8. A float valve according to claim 7, wherein said stabilizing means comprises a projecting ring means for abutting the movable wall when pressure is released from the control chamber.

9. A float valve according to claim 1, wherein an expansile chamber is formed by overlapping and telescoping extensions of the float and pilot valve for receiving liquid discharged from the bleeder port and delivering it to said reservoir, said overlapping and telescoping extensions forming a labyrinth passage within the reservoir for stabilizing operation of the float valve.

10. A float valve according to claim 9, wherein the control chamber has a movable wall for exerting pressure to close the main valve against the pressurized fluid source, and further comprises stabilizing means within the control chamber for maintaining proper alignment of the movable wall when the main valve is open.

11. A float valve according to claim 1, wherein the bleeder port is positioned generally centrally above the float, the float valve has peripherally arranged exhaust means for liquid from the pressurized light source, the float has an outer wall which tapers upwardly and inwardly to form an upper surface, said pilot valve is mounted on said upper surface, said reservoir has a continuous wall formed upon an upper portion of the float beneath the bleeder port and surrounding said pilot valve, and said vent means comprises small openings formed at the base of said wall.

* * * * *

UNITED STATES PATENT AND TRADEMARK OFFICE
CERTIFICATE OF CORRECTION

PATENT NO. : 4,258,746
DATED : March 31, 1981
INVENTOR(S) : GEORGE D. HUDSON

It is certified that error appears in the above-identified patent and that said Letters Patent are hereby corrected as shown below:

Column 5, line 31, "tapped" should read --trapped--.

Column 8, line 28 (claim 11, line 4), "light" should read --liquid--.

Signed and Sealed this

Thirtieth Day of June 1981

[SEAL]

Attest:

RENE D. TEGTMEYER

Attesting Officer

Acting Commissioner of Patents and Trademarks